May 28, 1968 A. BRAND 3,385,492

BIDIRECTIONAL TAPE TRANSPORT

Filed Feb. 21, 1966

INVENTOR.
ABRAHAM BRAND

BY Christie, Parker & Hale
ATTORNEYS 3,385,492
BIDIRECTIONAL TAPE TRANSPORT

Abraham Brand, Van Nuys, Calif., assignor to Consolidated Electrodynamic Corporation, Pasadena, Calif., a corporation of California Filed Feb. 21, 1966, Ser. No. 528,729
4 Claims. (Cl. 226—39)

ABSTRACT OF THE DISCLOSURE

There is described a magnetic tape transport in which the tape is directed in an elongated loop extending at its closed end around a capstan. A fly wheel is positioned inside the loop and spaced from the capstan, and means is provided for urging the tape on both sides of the loop into contact with the fly wheel. The heavy fly wheel provides a low pass filter between the capstan and the tape reels. The capstan is driven by a low inertia servosystem which removes low frequency fluctuations in the tape drive while the fly wheel removes high frequency flutter from the tape drive.

This invention relates to magnetic tape transports and, more particularly, is concerned with a high performance bidirectional tape transport suitable for instrumentation use.

In the design of high performance instrumentation tape recorders for recording and faithfully reproducing analog signals, the tape transport must be free of disturbances which introduce flutter into the recorded and reproduced signals due to changes in tape velocity. In the past, high performance instrumentation recorders frequently have utilized what is known as a "closed loop" drive configuration in which the tape engages one side of the capstan and then passes in a loop over an idler pulley and back to engage the opposite side of the capstan. The magnetic record and reproduce heads are in position along the tape loop intermediate the capstan and the idler. The capstan drive is provided with high inertia to provide a filtering action for any disturbances introduced in the tape by the reeling mechanism. Such a system is not readily adapted to bidirectional operation since it requires that the capstan be designed so as to attempt to feed the tape out of the loop at a higher rate than the tape feeds into the loop in order to maintain the tape within the loop in a stretched condition. Common techniques for accomplishing the stretch of the tape are effective for only one direction of tape movement.

In order to provide a relatively low cost high performance instrumentation tape recorder having bidirectional recording capability, an "open loop" is used in which the tape is guided from the supply reel past the magnetic heads and around a capstan so that the tape is pulled by the capstan across the heads. The addition of high inertia to the capstan in such a configuration does not help to isolate high frequency disturbances introduced on the tape by the reeling system from the heads, since the capstan is downstream from the recording heads.

In order to achieve high performance in an open loop type of configuration, it has been the practice to control the capstan rotation by a servo in response to a control or reference signal recorded on the magnetic tape. In this way, any disturbances introduced in the motion of the tape past the playback heads affects the reproduction of the control signal, which in turn is used to modify the servodrive speed to correct for such disturbances. In such an arrangement, it is desirable that the capstan drive be made as low in inertia as possible to increase the frequency of response of the servosystem. Since present capstan servo drives are only capable of responding to disturbances having frequency components below approximately 200 cycles per second, there is a problem in open loop tape drives with high frequency disturbances which affect the tape velocity across the recording heads.

The present invention is directed to an open loop type of magnetic tape drive having bidirectional capabilities utilizing a low mass servo but which at the same time provides a low level of high frequency flutter. At the same time, the present invention provides a multi-purpose high performance tape transport which is relatively simple, reliable, foolproof in operation and comparatively inexpensive.

This is provided, in brief, by a magnetic tape transport for driving magnetic tape past a magnetic head in which the tape passes in an open loop around a low inertia servo-controlled capstan. Mechanical low pass filter means engages the tape on the opposite side of the magnetic head from the capstan, the mechanical low pass filter being preferably in the form of a rotating high inertia mass which is driven by frictional engagement with the magnetic tape. Preferably, means is provided for moving the magnetic tape into engagement with the rotating mass during recording and out of engagement during playback to reduce the inertia of the system during playback operation.

For a more complete understanding of the invention, reference should be made to the accompanying drawings wherein.

Figures 1, 2:
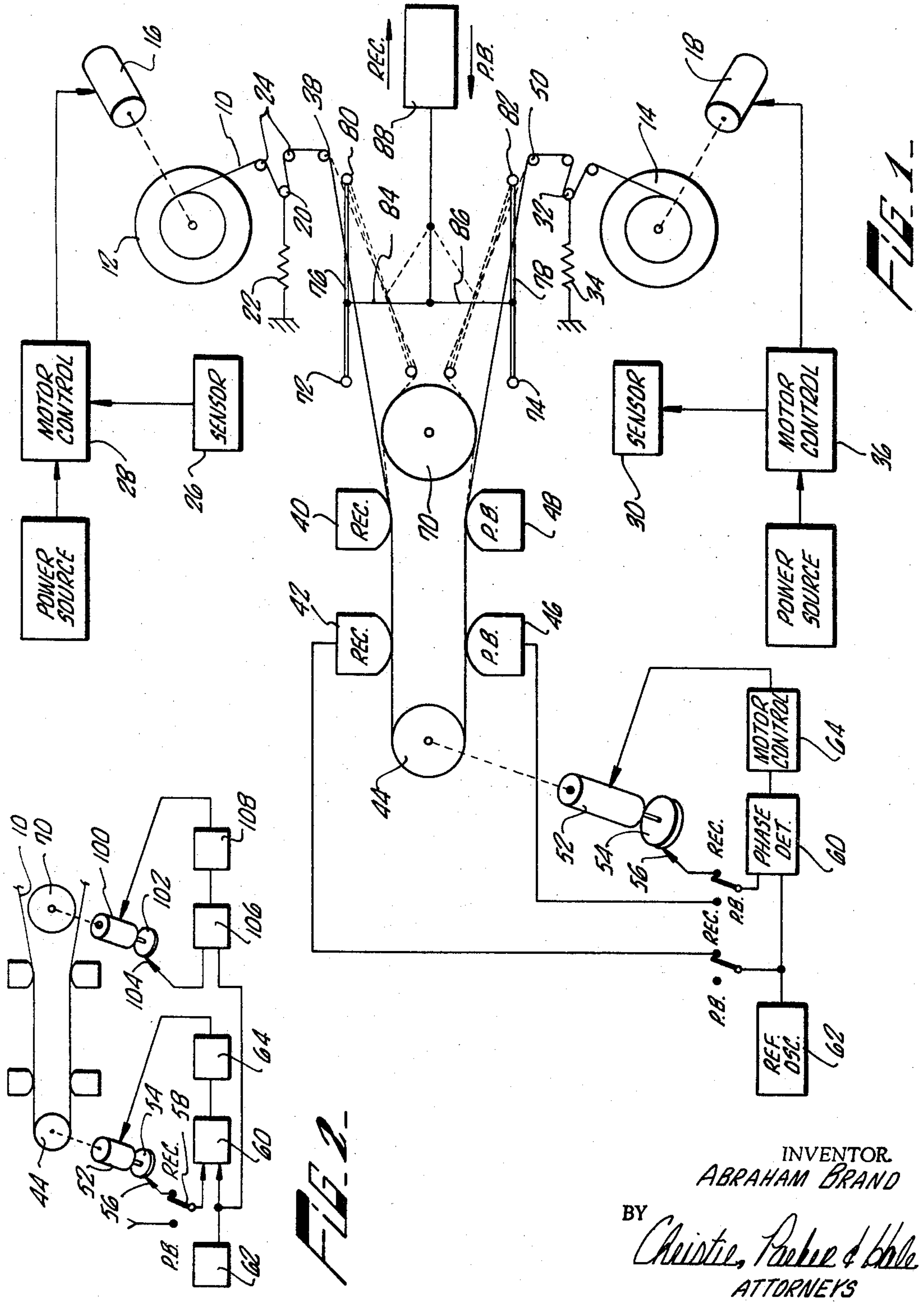
FIGURE 1 is a schematic showing of one embodiment of the invention.
FIGURE 2 is a modified arrangement incorporating the features of the present invention.

Referring to FIGURE 1 in detail, the numeral 10 indicates generally a length of magnetic tape which passes between a pair of storage reels 12 and 14. The reels 12 and 14 may be controlled in conventional fashion by reel motors 16 and 18 respectively, the reel motor 16 being controlled by a position servo that senses the position of a loop-forming idler 20 which applies tension to the tape through a spring 22. The loop in the tape is formed by a pair of guides 24. Sensing means, such as a potentiometer indicated at 26, senses the position of the idler 20 and by means of a motor control circuit 28 rotates the reel 12 at a rate to maintain the loop at some predetermined length. Similarly, the reel 14 is controlled from a sensor unit 30 which senses the position of an idler 32. The idler 32 by means of a spring 34 maintains a loop in the tape 10. The sensor 30 in sensing the length of the tape loop, controls the motor 18 through a motor control circuit 36. Such reel control circuits are conventional and well known in the art.

The magnetic tape 10, after passing around the loop forming idler 20 from the reel 12, is directed around a guide post 38 across one or more record heads such as indicated at 40 and 42, and around a capstan 44. The tape 10 after wrapping around the capstan 44 is directed over one or more playback heads, such as indicated at 46 and 48, around a guide post 50, and on to the reel 14. The capstan 44 is part of a low inertia drive system which, by virtue of the large wrap angle around the capstan 44, requires no pinch rollers to frictionally drive the tape which would add to the inertia of the drive system.

The capstan 44 is driven from a motor 52 which is preferably of a type known as a printed circuit motor and is characterized by very low inertia of the motor armature. A serrated disk 54 is driven by the motor 52 which, by means of a suitable pickup 56, generates a periodic signal in synchronism with the rotation of the motor 52. During record, a switch 58 connects the sensing element 56 to one input of a phase detector circuit 60. A reference oscillator 62 is connected to the other input of the phase detector 60. The output of the phase detector is applied to a suitable motor control circuit 64 by which the motor 52 is controlled so as to lock the phase of the synchronizing signal with that of the reference oscillator 62. Also during record, the switch 58 connects the output of the reference oscillator 62 to one channel of the record head 42 so that a control signal is recorded in one channel of the magnetic tape during the record operation.

During playback, the control signal is reproduced from the magnetic tape by one channel of the playback head 46. The control signal during playback is connected by the switch 58 to the phase detector 60 in place of the synchronizing signal and is compared by the phase detector 60 with the output of the reference oscillator 62 to control the motor 52. By this servo arrangement, the low inertia servosystem is able to correct for any low frequency disturbances which occur during the recording or to compensate for disturbances during the playback operation. Thus any disturbance that occurs producing low frequency flutter during recording is reflected as a frequency disturbance in the recorded control signal. During playback, the response time of the closed loop servo causes the tape speed to vary in response to the frequency changes in the control signal so that the system is self-compensating.

However, even though by careful design, the inertia of the servosystem is held to a minimum so as to permit correction for flutter frequencies up to several hundred cycles, the servo can not respond to disturbances of higher frequencies introduced during the recording operation. Adding inertia to the capstan drive not only would not help isolate the magnetic heads from high frequency disturbances that might occur during the recording operation but would reduce the response characteristics of the servo.

According to the present invention, a low pass mechanical filter is provided in the open loop system described above for isolating the tape in the vicinity of the recorded playback heads from high frequency disturbances introduced on the tape by the winding and reeling system. In the arrangement shown in FIGURE 1, the filter is in the form of a freely rotating drum 70. The diameter of the drum 70 is such that it is slightly less than the circle tangential to the magnetic tape as it passes between the guide 38 and the record head 40 and between the playback head 48 and the guide 50. Thus normally the tape just clears the periphery of the drum 70. A pair of movable guides, indicated at 72 and 74, are mounted on the end of support arms 76 and 78 respectively, the support arm 76 being pivoted at one end as indicated at 80. Similarly, the support arm 78 is pivoted at 82. The guides 72 and 74 are located on the opposite side of the tape from the drum 70. By moving the arms 76 and 78 towards each other into the dotted line position indicated in FIGURE 1, the magnetic tape, both upstream and downstream of the capstan and transducer heads, is caused to wrap around a portion of the periphery of the drum 70 so as to be in frictional engagement therewith. Suitable linkage, such as indicated at 84 and 86, connects the arms 76 and 78 to the linear drive member of a suitable linear actuator 88.

During the recording operation, the actuator 88 is positioned to draw the guides 72 and 74 towards each other into the dotted line position shown in FIGURE 1. Thus the magnetic tape is brought into contact with the drum 70 and imparts rotation to the inertial mass presented by the drum 70. This inertial mass operates as a low pass filter since it is not capable of responding to high frequency variations in tape velocity.

It should be noted that the inertia of the rotating mass 70 is selected to provide cutoff around the 200 cycles per second frequency. This permits the low inertia correction servo to function to reduce flutter at the lower frequencies while the added inertia of the drum 70 during recording effectively filters out higher frequency flutter components from the tape movement past the heads.

A modification of the arrangement of FIGURE 1 is shown in FIGURE 2. The modification of FIGURE 2 is substantially identical to that of FIGURE 1 except that the inertial drum 70, instead of rotating as an idler, is driven by a second low inertia printed circuit capstan motor 100. The motor 100 is servo-controlled from the reference oscillator 62 by means of a commutating disk 102 on the shaft to the motor 100 which generates a periodic signal in a pickup element 104. The periodic signal is applied to a phase detector 106 together with the output of the reference oscillator 62 to produce an error signal applied to a motor control circuit 108 for operating the motor 100. The servo control drive of the inertial drum 70 provides a means for cancelling out mechanical resonances which may occur in the overall drive system, and in this respect operates as a variable inertia fly wheel.

From the above description, it will be recognized that the transport system provides an arrangement for controlling or cancelling flutter over a wide frequency range during recording and playback. The system is symmetrical and therefore effective for bidirectional operation. High frequency flutter during record is much more of a problem than during playback because of the effect of such flutter components recorded as part of the reference signal on the tape have on the operation of the closed loop servo during the playback mode of operation. Therefore the inertial load can be removed during playback. While it is desirable to remove the inertial load from the tape during playback in order to get maximum frequency response out of the capstan drive servo, the inertia of the drum may remain in the system during playback but wtih some sacrifice in the low frequency flutter correction of the system.

What is claimed is:

1. A magnetic tape transport for driving magnetic tape past a magnetic head, the transport comprising a capstan, means for driving the capstan including a low inertia closed loop servo-controlled motor, and means for controlling the speed of the motor in response to a reference signal, the magnetic tape engaging the surface of the capstan and being driven thereby, means for guiding the tape across the magnetic head as it is driven by the capstan, and a mechanical low pass filter means engaging the tape on the opposite side of the head from the capstan for filtering out high frequency perturbations in tape velocity in the region of the head, the cut-off frequency of the low pass filter being substantially at the upper limit in frequency response of the servomotor-controlled capstan drive means.

2. Apparatus as defined in claim 1 wherein said filter means includes a rotating mass member and means for engaging the rotating mass member with the moving tape, and drive means for the rotating mass, said drive means including a closed loop servo-controlled motor synchronized with the capstan drive motor.

3. Apparatus for recording on or playing back from magnetic tape in which the tape may be driven in either direction, comprising a capstan, means for rotating the capstan in either direction, low pass filter means including a rotating member spaced from the capstan and having a substantially cylindrical surface, tape guide means for directing the tape in a loop extending around the capstan and extending on either side of the cylindrical surface of said member, said guide means including means urging the tape into contact with the cylindrical surface of said member at two substantially diametrically opposite regions thereof, and transducer heads engaging the tape on both sides of the capstan between the capstan and the rotatable member.

4. Apparatus as defined in claim 3 further including means moving said tape urging means away from the tape to disengage the tape from the rotatable member during the playback operation.

References Cited

UNITED STATES PATENTS

| | | | |
|---|---|---|---|
| 3,179,752 | 4/1965 | Brenner | 179—100.2 |
| 3,270,935 | 9/1966 | Selsted et al. | 226—188 |

ALLEN N. KNOWLES, *Primary Examiner.*